United States Patent [19]
Pratt et al.

[11] Patent Number: 4,736,385
[45] Date of Patent: Apr. 5, 1988

[54] TRANSMITTER AND RECEIVER CIRCUIT

[75] Inventors: Warren R. Pratt, Stillwater; Charles R. Rogers, Maple Grove; Dennis G. Cope, Hopkins, all of Minn.

[73] Assignee: Computer Network Technology Corporation, New Hope, Minn.

[21] Appl. No.: 7,950

[22] Filed: Jan. 27, 1987

[51] Int. Cl.[4] .................... H04L 25/08; H04B 3/50
[52] U.S. Cl. .................................. 375/7; 178/63 R; 375/36; 375/104
[58] Field of Search ............... 178/63 R, 63 B, 63 C, 178/63 E; 330/262, 270; 375/7, 36, 104; 370/85; 455/218, 219, 229, 248; 307/475

[56] References Cited

U.S. PATENT DOCUMENTS

| | | | |
|---|---|---|---|
| 3,613,012 | 10/1971 | Feistel | 375/104 |
| 3,671,671 | 6/1972 | Watanabe | 178/63 R |
| 4,086,534 | 4/1978 | Olson | 375/36 |
| 4,425,663 | 1/1984 | Lam | 178/63 R |
| 4,434,497 | 2/1984 | Rolfe | 178/63 R |

Primary Examiner—Benedict V. Safourek
Attorney, Agent, or Firm—Donald F. Voss

[57] ABSTRACT

High frequency transmitter and receiver circuits are AC coupled for party line transmission over coaxial cable where the circuits are connectable to the cable by use of stinger taps and thereby eliminate the need to interrupt service when connecting the circuits to the cable. The transmitter circuit includes oppositely polled current sources which are alternately switched to the coaxial cable via the stinger tap or to a dummy load by current switches connected to data inputs via buffer circuits. A transmit enable circuit controls the current sources to be active or inactive and to prevent unbalances from saturating either current sources. The receiver includes a high input impedance biasing network and buffer amplifier that maintain the high input impedance even when power is off. Capacitance at the tap is reduced by a capacitor drive circuit which feeds input signal back to transmitter blocking diodes and to the trunk tap. A feed ahead network, differentiating network, and another buffer amplifier form a network for recovering the transmitted signal shape regardless of distance from the transmitter. A gated amplifier restores the shaped signal to logic levels ready for conversion to non-return-to-zero data. Filter and buffer circuits restrict level detection to signals in the frequency band of the transmitter. A threshold circuit sets the carrier sense detection level and a high gain amplifier converts signals above the threshold to ECL logic levels. After conversion of the ECL logic levels to TTL logic signals, a single shot produces a DC level from the logic level carrier signal. That DC carrier sense output enables data conversion circuits and drives a gate circuit for gating the gated amplifier.

20 Claims, 9 Drawing Sheets

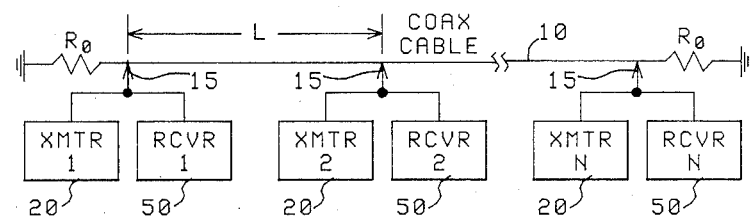
FIG. 1
FIG. 2
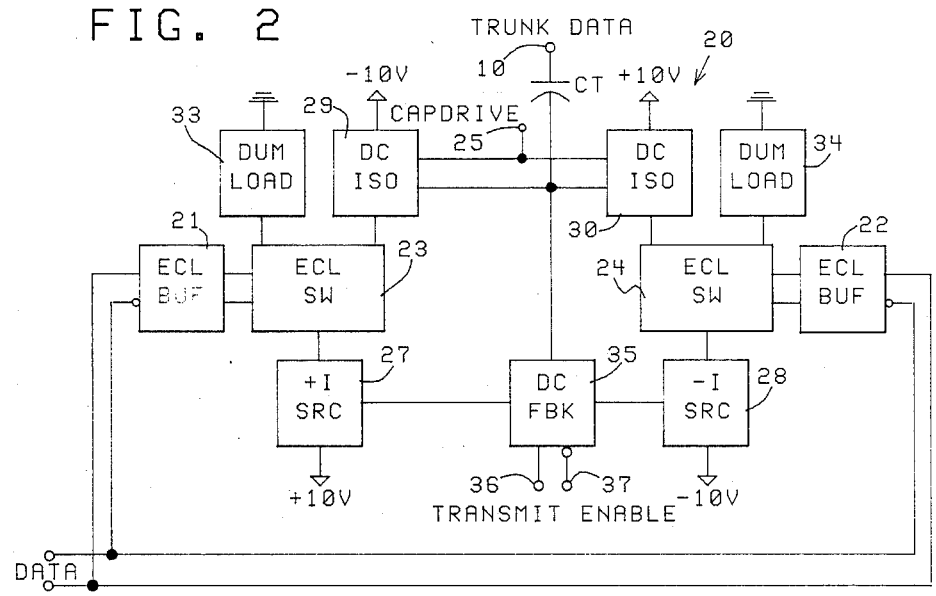

TRANSMITTED SIGNAL

RECEIVED SIGNAL, 1000' ALONG THE CABLE

RECEIVED SIGNAL, 2000' ALONG THE CABLE

RECEIVED SIGNAL, 4000' ALONG THE CABLE

RECEIVED SIGNAL, 6000' ALONG THE CABLE

TRANSMITTED SIGNAL, DIFFERENTIATED.

RECEIVED SIGNAL, 1000' ALONG THE
CABLE, DIFFERENTIATED.

RECEIVED SIGNAL, 2000' ALONG THE
CABLE, DIFFERENTIATED.

RECEIVED SIGNAL, 4000' ALONG THE
CABLE, DIFFERENTIATED.

RECEIVED SIGNAL, 6000' ALONG THE
CABLE, DIFFERENTIATED.

TRANSMITTER AND RECEIVER CIRCUIT

TECHNICAL FIELD

This invention relates to transmitter and receiver circuits and more particularly to such circuits which are capable of operating at high frequencies and are adapted to be AC coupled for party line transmission over coaxial cable. The invention finds particular utility in digital data transmission systems.

BACKGROUND ART

Prior transmitter and receiver circuits operating at high frequencies required that the data transmission system be interrupted or shut down in order to connect the transmitter and receiver circuits to the coaxial cable of the system, such as in U.S. Pat. No. 4,086,534 where the transmitting and receiving circuits are tapped into the transmission line by physically opening the line after the system has been shut down. In that patent, the transmitting and receiving circuits form a part of distributed delay line which is used to connect them to the coaxial cable transmission line. The use of the distributed delay line for performing the connection has limitations with respect to data transmission rates and transmission line length. Ideally, the attachment of transmitter and receiver circuits should be made with zero loading of the transmission line at high frequencies and without interruption of system operation.

In the present invention, the transmitter and receiver circuits can be attached to the transmission line without interrupting the system. Also, the transmitter and receiver circuits can be attached to the transmission line with low loading of the line so as to enable the transmission of data at high frequency and the attachment of a large number of transmitter and receiver circuits. The transmitter and receiver circuits of the present invention are structured to present high impedance at the connection to the coaxial transmission cable. In the past, the transmitter and receiver circuits present too much capacitance at the connection to the transmission line and thus relatively low impedance. The lower impedance causes greater attenuation and thus a fewer number of transmitter and receiver circuits can be attached and the length of the transmission line is limited because of the losses caused by the attenuation. Also, the frequency or data rate of the transmission line becomes limited because of the losses caused by the attenuation.

The transmitter and receiver circuits of the present invention present high impedance at the connection to the transmission line whether powered on or off. This enables the use of stinger taps for connecting the transmitter and receiver circuits to the coaxial transmission line without interrupting the system operation. A stinger tap physically attaches to the coaxial cable by use of a clamp where two outboard terminals make contact with the shield of the coaxial cable and a central screwed needle, the stinger, pierces the insulation to contact the central conductor. The stinger tap is compatible with the present invention in that it also presents low capacitance, i.e. high impedance, at the connection so as not to load the transmission line.

SUMMARY OF THE INVENTION

The principal object of the invention is to provide improved transmitter and receiver circuits and more particulary to provide such circuits which: operate at high data rates; can be attached to a coaxial transmission line without interrupting operation of the system; can be attached to the coaxial transmission line through a stinger tap; enable attachment of a relatively large number of transmitter and receiver circuits to the transmission line; attach to the transmission line with low loading thereof whether powered or unpowered; and provide for received signal shaping for optimum reception at short and long distances. These objects are achieved by electronically disconnecting the transmitter in the off state to present high impedance at the tap. The transmitter through the facility of current steering transistors generates high power pulses at the desired operating frequency. The receiver presents a high impedance at the tap with the power on or off. This is accomplished electronically through the facility of a high resistance network and diode junction of a transistor. Pulse shaping is accomplished in the receiver by using a differentiating network to take out low frequency signal components when signals transmitted have small amplitudes and are at a substantial distance from the transmitter whereby high frequencies are passed. When the signal amplitude is large, the signals are passed around the differentiator by a feed forward diode circuit. When the signal amplitudes are between small and large, there is combined action of the differentiator and feed forward circuit.

The high frequency, high gain receiver circuit includes a high input impedance biasing network for maintaining high input impedance even when power is off. It also includes a network for feeding input signal back to the transmitter circuit and to the coaxial cable tap to reduce capacitance at the tap. A feed ahead network, differentiating network and a buffer amplifier function to recover the transmitted signal shape regardless of distance from the transmitter. The recovered signal shape is then restored to logic levels which are ready for conversion to data of the desired format such as non-return-to-zero data. Level detection is restricted to signals in the frequency band of the transmitter.

BRIEF DESCRIPTION OF THE DRAWINGS

FIG. 1 is a schematic block diagram illustrating how the transmitter and receiver circuits of the present invention are connected to a trunk coaxial cable;

FIG. 2 is a schematic block diagram illustrating the transmitter circuit of the present invention;

FIG. 5c is an alternate embodiment of the differentiating network in FIG. 5a;

DETAILED DESCRIPTION

Figure 3:
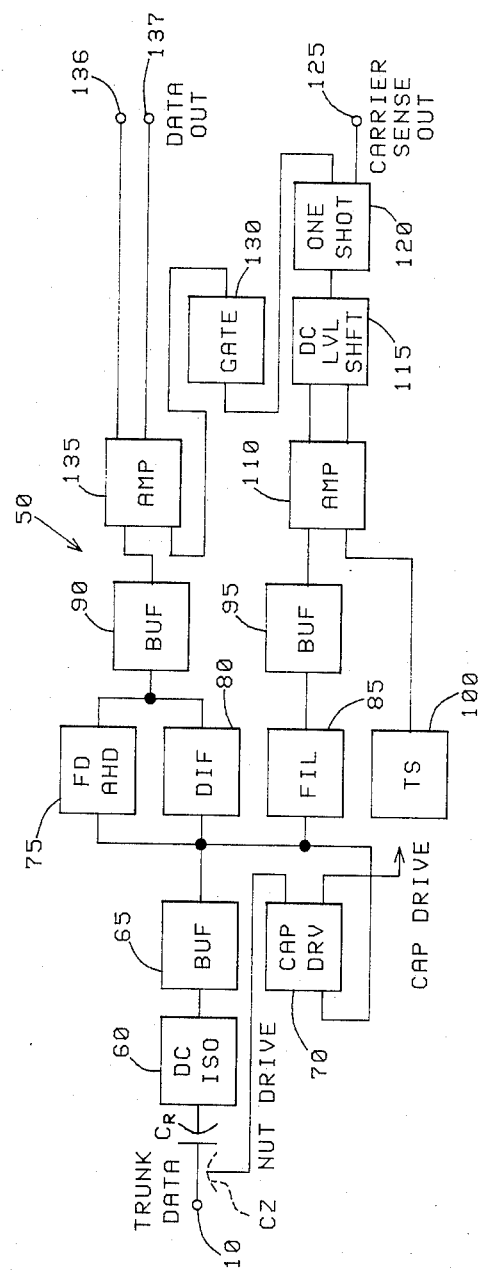
FIG. 3 is a schematic block diagram illustrating the receiver circuit of the present invention.

With reference to the drawings and paticularly FIG. 1 the invention is illustrated by way of example with pairs of transmitter and receiver circuits 20 and 50 respectively, connected by means of stinger taps 15 to coaxial cable 10. Coaxial cable 10 is terminated in its characteristic impedance Ro at each end. The transmitter 20 and receiver 50 pairs are spaced from each other a minimum distance L which is a distance where the total signal loss due to cable loss and transmitter and receiver pair loading does not exceed 46 db.

The transmitter 20, FIG. 2, includes emitter coupled logic blocks 21 and 22 which are buffers connected to receive both polarities of the input data to be transmitted. Buffers 21 and 22 are connected to operate switches 23 and 24 respectively, where the switches 23 and 24 are connected to positive and negative current sources 27 and 28 respectively, and function to switch the current sources 27 and 28 alternately to the trunk coaxial cable 10 through respective DC isolation circuits 29 and 30 and through capacitor CT. When the current sources 27 and 28 are switched from the trunk coaxial cable 10, they alternately drive respective dummy loads 33 and 34.

A DC feedback circuit 35 forces an average 0.0 V DC level at the transmitter side of capacitor CT to prevent unbalances from saturating either switches 23 or 24. Feedback circuit 35 also contains circuits for disabling the positive and negative current sources 27 and 28 for the purpose of reducing power dissipation and reducing transmitter loading of the coaxial cable 10.

The buffers 21 and 22 are shown in circuit detail in FIG. 4 where each includes a pair of transistors Q11, Q12, and Q111, Q112 respectively. The bases of transistors Q12 and Q112 are connected to terminals for receiving data (DAT) and to minus 5.2 V (−5.2 V) via resistors R12 and R112 respectively. The bases of transistors Q11 and Q111 are connected to receive not data ($\overline{DAT}$) and to minus 5.2 V (−5.2 V) via resistors R11 and R111 respectively. The collectors of the transistors Q11 and Q12 are connected to a minus 5.2 V (−5.2 V). The collectors of transistors Q111 and Q112 are connected to a plus 5.0 V (+5.0 V). The emitters of Q11 and Q12 are connected via zener diodes CR11 and CR12 respectively, to the bases of transistors Q21 and Q22 respectively of switch 23. The emitters of transistors Q111 and Q112 are connected via zener diodes CR111 and CR112 to the bases of transistors Q121 and Q122 respectively of switch 24. The bases of transistors Q21 and Q22 are also connected to plus 10 V (+10 V) via resistors R21 and R22 respectively. Transistors Q121 and Q122 have their bases also connected to minus 10 V (−10 V) via resistors R121 and R122 respectively. The emitters of transistors 21 and 22 are connected to the collector of transistor Q31 of current source 27. The emitters of transistor Q121 and Q122 are connected to the collector of transistor Q131 of current source 28.

The base of transistor Q31 is connected to the collector of transistor Q212 of DC feedback circuit 35 and to plus 10 V (+10 V) via diode D31 which is in series with resistor R31. The emitter of transistor Q31 is connected to plus 10 V(+10 V) via resistor R32. By this arrangement, current flowing through diode D31 and resistor R31 establish a voltage across the base emitter of transistor Q31 and resistor R32. This results in a DC current flow from the collector of transistor Q31 toward the emitters of transistors Q21 and Q22 of positive current switch 23. It should be noted that diode D31 is thermally coupled to transistor Q31 to provide temperature compensation for changes in temperature of transistor Q31 and resulting VBE changes thereof.

The collectors of transistors Q21 and Q22 are connected to DC isolation circuit 29 and dummy load circuit 33 respectively. More specifically, the collector of transistor 21 is connected to the trunk coaxial cable 10 via diodes D52 and D53 and capacitor CT, to a minus 10 V (−10 V) via diode D51 in series with resistor R51 and to ground potential via a capacitor C51. The collector of transistor Q22 is connected to ground potential via a parallel network of resistor R41 and capacitor C41.

When data is present, DAT is at a high level and the bases of transistors Q21 and Q22 are low and high respectively, whereby transistor Q21 is conducting and transistor Q22 is off. Drive current from the positive current source 27 is thus steered to the trunk 10 via the DC isolation diodes D52 and D53 and capacitor CT. In the absence of data, $\overline{DAT}$ and the bases of transistors Q21 and Q22 are high and low respectively, whereby transistor Q21 is off and transistor Q22 is conducting. Drive current from the positive current source 27 is steered under this condition to the dummy load 33 formed by the resistor R41 and capacitor C41.

Resistors R21 and R22 of current switch 23 are pull up resistors to provide adequate loading for the high current buffer transistors Q11 and Q12 and level shifting zener diodes CR11 and CR12 of buffer 21. The zener diodes CR11 and CR12 are selected to provide sufficient head room for the current source transistor Q31 and for the transistors Q21 and Q22 of switch 23 so that the +10 V and −10 V supplies can vary ±/−15% without appreciably affecting transmitter performance. In other words, the signal swing stays within the limits of the power supply. It should also be noted that the current switch 23 provides the high speed, up to and over 100 MHz data rate at current levels up to and exceeding 100 MA.

It is also important to note that the DC isolating network 29 disconnects the collector of transistor Q21 from the transmitter side of capacitor CT and the trunk 10 when transistor Q21 is off. With transistor Q21 off, the −10 V back bias is applied to diode D52 through resistor R51 and diode D51. This back bias prevents current flow through diode D52 and minimizes capacitance across diode D52. Diode D52 can be two or more diodes in series to reduce its total "off" capacitance. It should also be noted that the transmitter 20 has a CAP DRIVE terminal 25 which is connected to receive input signal from the receiver 50 to reduce capacitance at tap 15 on cable 10. Terminal 25 is connected to cable 10 via diodes D53 and D153.

In the event power to the transmitter 20 is shut down, the −10 V supply goes to ground potential or OV. The back bias can no longer be supplied through resistor R51 and diode D51. The positive current driver 29 is still isolated from the trunk 10, however, because capacitor C51 and the collector capacitance of transistor Q21 are charged negative through diodes D52 and D53 by the first few preamble pulses when a nearby transmitter puts a signal on the coaxial cable 10. Diode D51 prevents discharge of the capacitances of capacitor C51 and of the collector of transistor Q21. Hence the positive current driver 27 is maintained isolated from the trunk 10 by the charge back bias on diode D52.

The negative current source 28 functions in a manner substantially the same as positive current source 27 and consists of substantially the same components. It includes transistor Q131 having its emitter connected to minus 10 V ($-10$ V) via resistor R132. Its base is connected to the collector of transistor Q214 of DC feedback circuit 35. The base of transistor Q131 is also connected to $-10$ V via diode D131 and resistor R131. The collector of transistor Q131 is connected to the emitters of transistors Q121 and Q122 of switch 24. The collector of transistor Q121 is connected to the trunk 10 via diodes D152 and D153 and capacitor CT, to $+10$ V via diode D151 and resistor R151 and to ground potential via capacitor C151, all making up the DC isolation circuit 30 which functions like isolation circuit 29.

Switch 24 also functions to steer current from negative current source 28 to dummy load 34. The collector of transistor Q122 is connected to ground potential via resistor R141 connected in parallel with capacitor C141. The negative current drive works substantially the same as the positive current drive except the DC level shifts through zener diodes CR111 and CR112 can be less because the outputs of transistors Q111 and Q112 are nearer the negative voltages on the bases of transistors Q121 and Q122 than the outputs of transistors Q11 and Q12 are to the positive voltages on the bases of transistors Q21 and Q22. Note, the negative driver 28 drives the trunk 10 when $\overline{DAT}$ is high whereas the positive driver 27 drives the trunk 10 when DAT is high.

Both the positive and negative current sources 27 and 28 are controlled by the DC feedback circuit 35. Enable (ENBL) and not enable ($\overline{ENBL}$) control signals can be selectively applied to terminals 36 and 37 respectively. When an ENBL signal is applied to terminal 36, approximately $+3.5$ V, diode D211 is back biased. The voltage on the base of transistor Q212, which is connected to terminal 36 via diode D211, is set by regulated $+5.0$ V supply and the ratio of resistors R213 to R214. The base of transistor Q212 is connected to $+5.0$ V via resistor R214 and to ground potential via resistor R213. The base voltage of transistor Q212 is set to establish a current through resistor R212 that will provide the desired bias voltage across diode D31 and resistor R31 of the positive current source 27, where the base of transistor Q31 is connected to the collector of transistor Q212. The emitter of transistor Q212 is connected to the emitter of transistor Q211 via resistor R212, the collector of transistor Q211 being connected to $-5.2$ V and its base being connected to trunk 10 via resistor R211 and capacitor CT and connected to ground potential via capacitor C211.

If the voltage at the base of transistor Q211 goes slightly negative, indicating that the positive current source 27 is supplying less current than the negative current source 28, then the voltage across resistor R212 will be increased. This results in higher current from the positive current source 27 to reduce the positive current source 27 underdrive.

When the ENBL signal is low, approximately 0.0 V, diode D211 turns on and the base of transistor Q212 is pulled to approximately $+0.6$ V to back bias the base emitter junctions of transistors Q212 and in turn Q211, stopping current flow through resistor R212 and thereby turn off transistor Q31 to turn the positive current source 27 off. The not enable ($\overline{ENBL}$) terminal 37 is connected to the base of transistor Q214 via resistor R218 and to $+5.0$ V via resistor R219. The base of transistor Q214 is also connected to $-5.2$ V via resistor R217. The collector of transistor Q214 is connected to the base of transistor Q131 of the negative current source 28. The emitter of transistor Q214 is connected to the emitter of transistor Q213 via resistor R216. Transistor Q213 has its base connected in the same manner as the base of transistor Q211, ie. to the trunk 10 via resistor 211 and capacitor CT and to ground potential via capacitor C211. The collector of transistor Q213 is connected to $+5.0$ V.

The negative current source 28 is enabled when the $\overline{ENB}$ is low or approximately 0.0 V. Under this condition, the base voltage of the transistor Q214 is set by the regulated $-5.2$ V and the ratio of the resistors R218 to R217. The negative current source 28 is off when the $\overline{ENBL}$ is high or approximately $+3.5$ V. The base voltage of transistor Q214 then becomes approximately $-0.6$ V which in turn back biases transistors Q214 and Q213, stopping the current flow through resistor R216 to shut off the negative current source 28.

The high frequency, high gain receiver 50, FIG. 3, is connected to trunk cable 10 via blocking capacitor CR which connects to a high input impedance biasing network in DC isolation block 60. The DC isolation block 60 connects to buffer amplifier circuit 65 which with block 60 maintain a high input impedance even when power is off. The output of buffer amplifier circuit 65 connects to capacitor drive circuit 70 which feeds the input from trunk cable 10 back to the transmitter blocking diodes D53 and D153 in FIGS. 4a and 4b and to the trunk tap as illustrated by capacitor CZ shown in dashed line form to reduce capacitance at the tap.

The output of buffer circuit 65 is also connected to feed ahead circuit 75, differentiating circuit 80 and filter circuit 85. The outputs of feed ahead circuit 75 and differentiating circuit 80 connect to buffer amplifier circuit 90 and the combination of these circuits form a network that recovers the transmitted signal shape irrespective of the distance from the transmitter. Gated buffer amplifier circuit 90 restores the shaped signal to logic levels that are in a form for conversion to non-return to zero data.

Filter circuit 85 is connected to buffer circuit 95 which together function to restrict level detection to signals in the frequency band of the transmitter 20 used in this network.

Threshold circuit 100 sets the carrier sense detection level and high gain amplifier 110 which connects to buffer circuit 95 and threshold circuit 100 converts signals above the threshold to ECL (Emitter Coupled Logic) logic levels. Amplifier circuit 110 connects to the DC level shifter circuit 115 which converts ECL logic signals to TTL (Transistor Transistor Logic) logic signals. Single shot circuit 120 is connected to the output of level shifter circuit 115 and functions to produce a DC level from the logic level carrier signal, the resulting DC level signal being Carrier Sense Out at terminal 125. The Carrier Sense Out signal enables data conversion circuits (which are not shown and are not part of the present invention) and drives amplifier gate circuit 130 which gates amplifier circuit 135. The received data appears at the outputs of amplifier circuit 135, both polarities, on terminals 136 and 137.

Figure 5A:
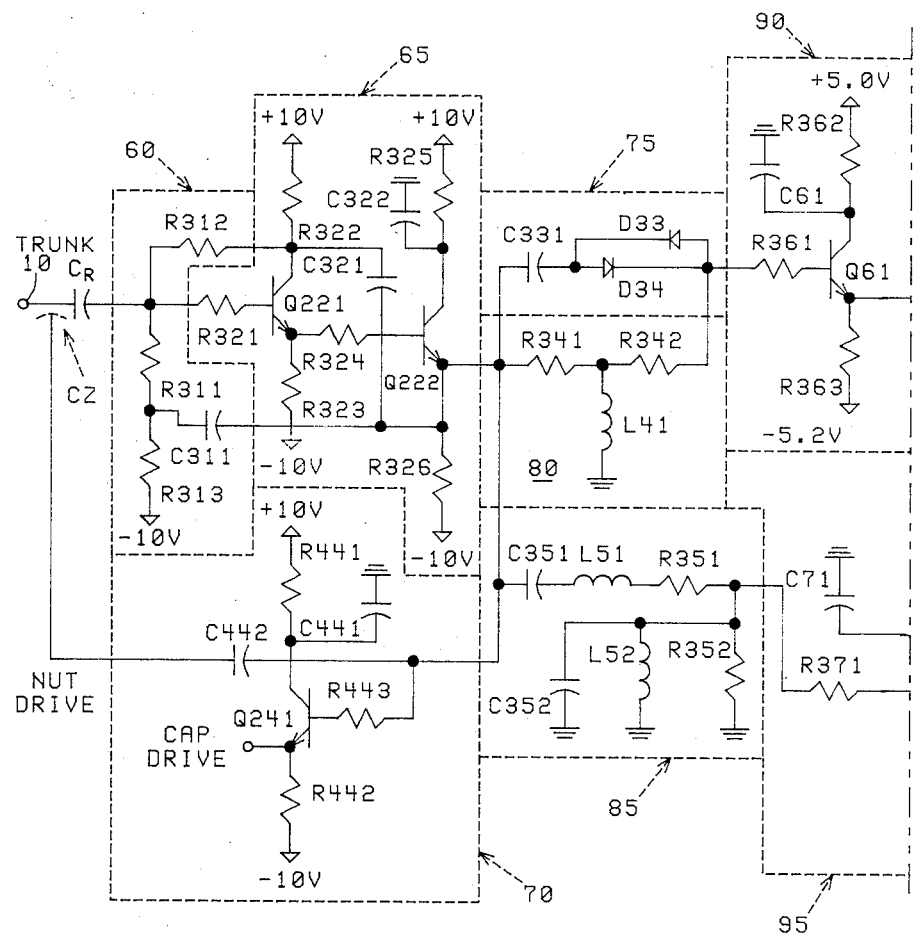
FIGS. 5a and 5b with FIG. 5a disposed to the left of FIG. 5b taken together are a schematic circuit diagram of the receiver circuit illustrated in block form in FIG. 3.

The DC isolation circuit 60, FIG. 5a has a bias network of resistors R312, R311, and R313 connected to establish a DC bias level for buffer amplifier 65. Resistor R312 is connected to +10 V via resistor R322 of the buffer amplifier 65 and to resistor R311 which has its other end connected to −10 V via resistor R313. Buffer amplifier 65 includes transistors Q221 and Q222 which form a high impedance current amplifier to drive shaping and filter networks. The base of transistor Q221 is connected via resistor R321 to capacitor CR at the junction point of resistors R312 and R311. The collector of transistor Q221 is connected to +10 V via resistor R322 and its emitter is connected via resistor R323 to −10 V and connected to the base of transistor Q222 via resistor R324.

Transistor Q222 has its collector connected to +10 V via resistor R325 and to ground potential via capacitor C322. The emitter of transistor Q222 is connected to −10 V via resistor R326, to the collector of transistor Q221 via capacitor C321, to the junction point between resistors R311 and R313 via capacitor C311, to capacitor C331 of feed ahead circuit 75, to resistor R341 of differentiating circuit 80, to capacitor C351 of filter circuit 85, to capacitor C442 and to resistor R443 of the capacitor drive circuit 70. It should be noted that the value of resistor R312 is quite high, approximately 50K ohms and the input signal is fed back to the collector of transistor Q221 to reduce the loading of resistor R312. Similarly, the loading effect of resistor R311 is reduced by the feed back of input signal through capacitor C311 to one end of resistor R313.

The output of amplifier 65 is taken from the emitter of transistor Q222 and is a replica of the input at input and stabilizing resistor R321 that isolates the base capacitance of transistor Q221 from the trunk input 10.

Resistor R321 also prevents any high frequency pickups which could cause oscillations of transistor Q221.

Resistor R323 establishes the bias current through transistor Q221 and power dissipation therein is reduced by resistor R322. The input impedance of transistor Q221 is raised by an AC feedback network formed by capacitor C321 and resistor R322 that feeds input signal back to the collector of transistor Q221. Resistor R324 is an input stabilizing resistor that isolates capacitance of transistor Q222 from the emitter output of transistor Q221 and thereby prevents excessive high frequency gain and resulting oscillations.

Resistor R326 establishes the bias current through transistor Q222 and provides signal pull down. A decoupling network is formed by capacitor C322 and resistor R325 that prevents signal feedback through the collector of transistor Q222. Resistor R325 also reduces power dissipation in transistor Q222.

Figure 4A:
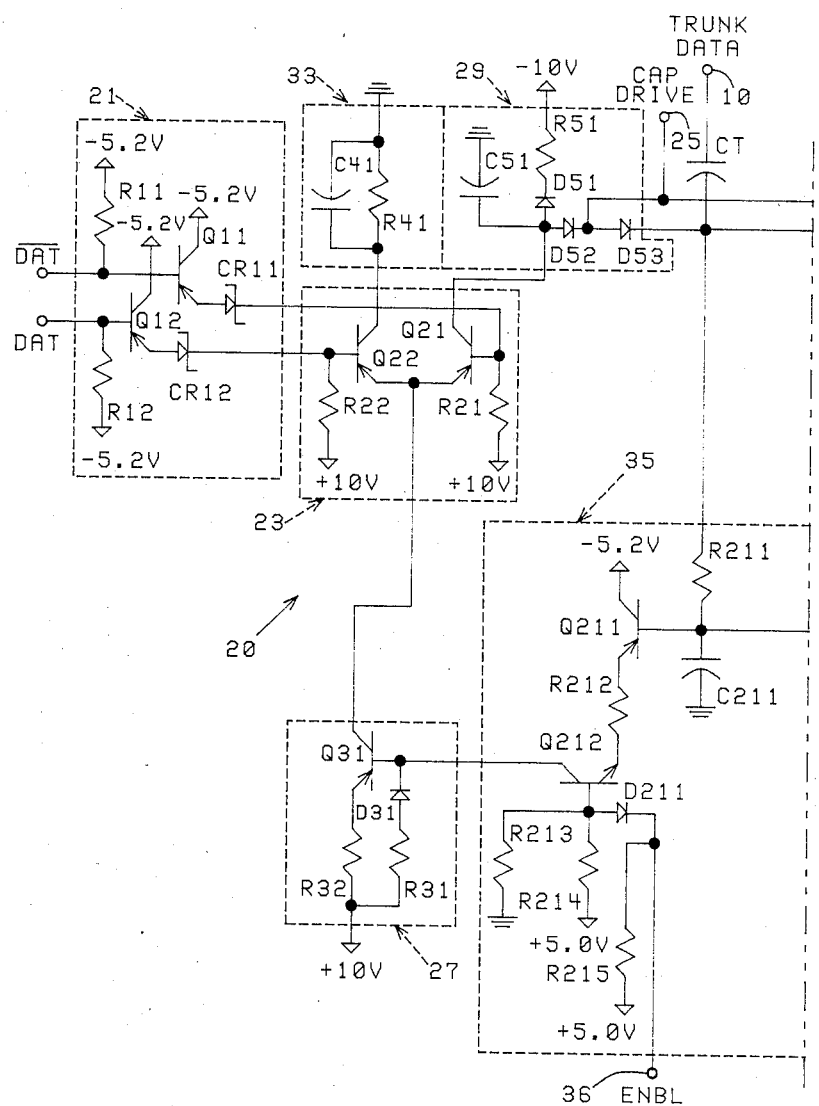
FIGS. 4a and 4b with FIG. 4a disposed to the left of FIG. 4b taken together are a schematic circuit diagram of the transmitter circuit illustrated in block form in FIG. 2.
Figure 4B:
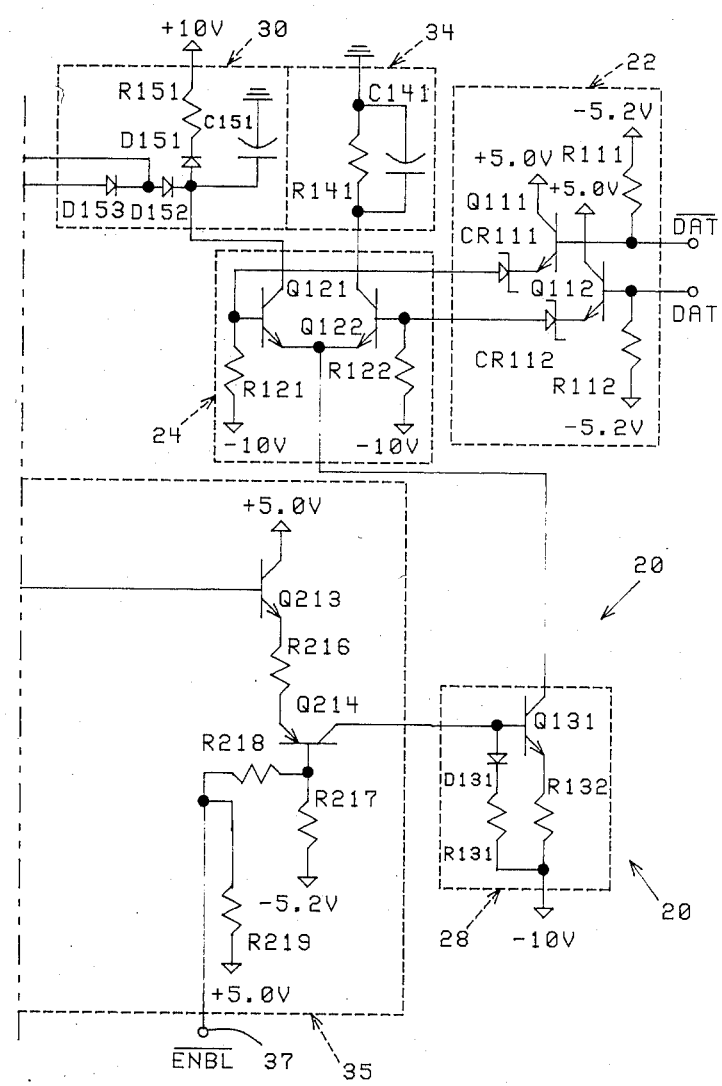

Transistor Q241 of the capacitor drive network 70 is a buffer amplifier having its output connected to feed input signal back to the transmitter isolation diodes D53 and D153, FIGS. 4a and 4b. Resistor R441 connected in the collector circuit of transistor Q241 is a stabilizing resistor for preventing high frequency oscillations together with capacitor C441. Resistor R441 also limits power dissipation of transistor Q241 and resistor R442 is a buffer bias resistor. Capacitor C442 feeds input signal back to the stinger tap 15 to aid in reducing capacitive loading at the tap 15.

Differentiating circuit 80 which functions to recover the signal shape consists of resistor R341, inductor L41 and resistor R342 where resistor R341 is connected at one end to the emitter of transistor Q222 and at its other end to one end of inductor L41 and to one end of resistor R342. The other end of inductor L41 is connected to ground potential and the other end of resistor R342 is connected to a pair of diodes D33 and D34 connected in parallel in feed ahead circuit 75.

Figure 5C:
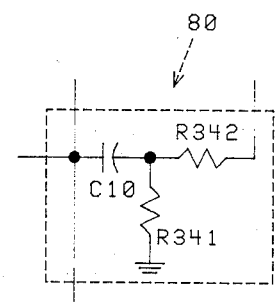
Figure 5B:
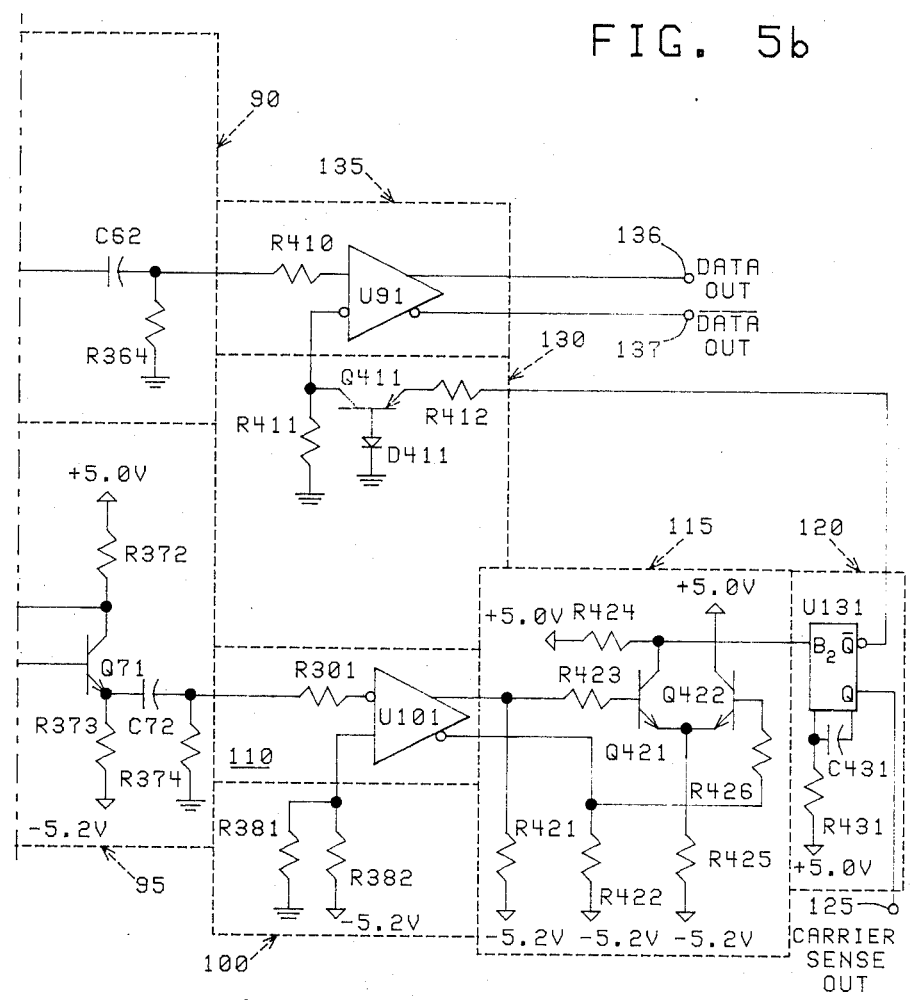
Figure 6:
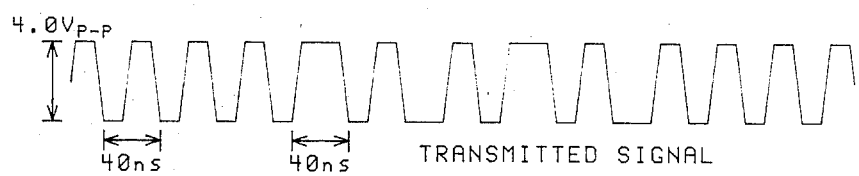
FIG. 6 is a waveform diagram showing the transmitted signal and received signals along a coaxial cable at 1000 ft., at 2000 ft., at 4000 ft.
Figure 6:
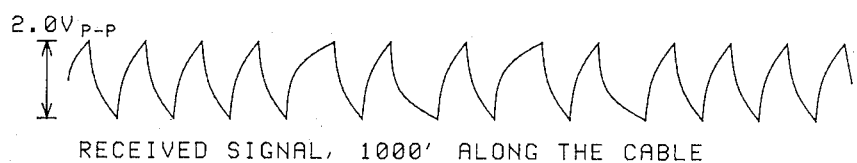
Figure 6:
Figure 6:
Figure 6:
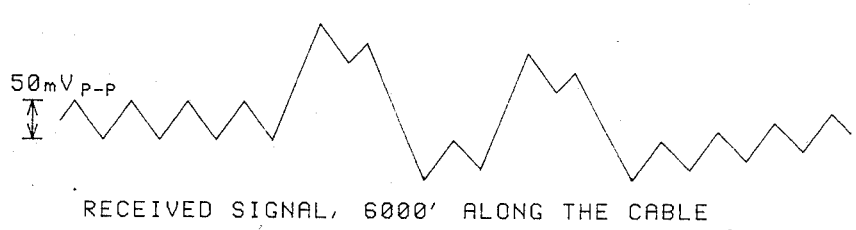
Figure 7:
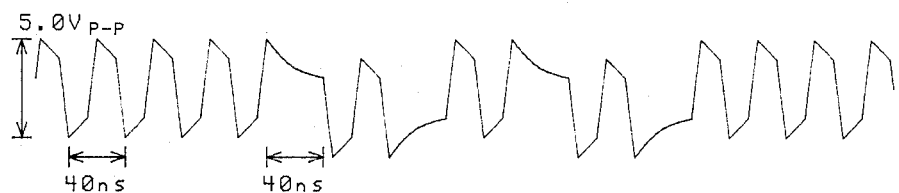
FIG. 7 is a waveform diagram showing the transmitted signal differentiated and the received signal differentiated along a coaxial cable at 1000 ft., at 2000 ft., at 4000 ft. and at 6000 ft.
Figure 7:
Figure 7:
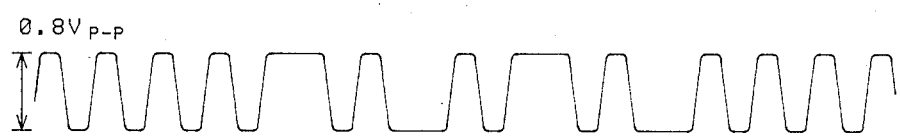
Figure 7:
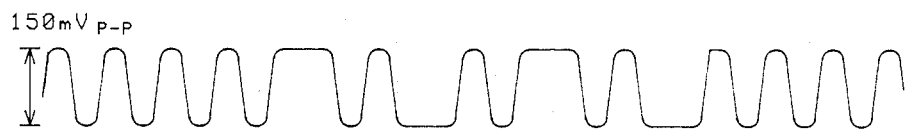
Figure 7:

Differentiating circuit 80 is a key part of receiver 50 for low level signal reception. When pulses are transmitted long distances over coaxial cable, the loss parameters of the cable integrate the signal. Examples of the transmitted signal and the received or recovered signal at different distances along a coaxial cable are shown in FIG. 6. A differentiating network will recover the signal shape except for some high frequency losses. Examples of the transmitted signal differentiated and the received or recovered signal differentiated at different distances along a coaxial cable are shown in FIG. 7. The values of resistor R341 and inductor L41 are selected for optimum signal recovery at a specified or predetermined distance along a coaxial cable. It should be noted that the differentiating circuit 80 can take different forms and an alternate form is shown in FIG. 5c where a capacitor C10 is substituted or connected in the position occupied by resistor R341 in FIG. 5a and the latter resistor is connected in the position occupied by inductor L41; the position of resistor R342 remains unchanged and the inductor L41 is eliminated.

Figure 8:
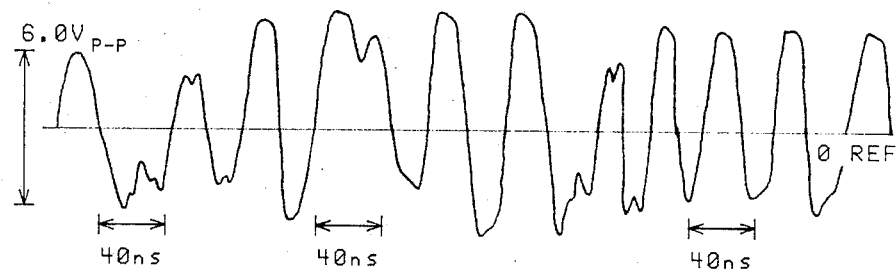
FIG. 8 is a waveform diagram illustrating the transmitted signal with reflections and the transmitted signal with reflections differentiated and showing false zeros caused by differentiating lossless signals with reflections.
Figure 8:
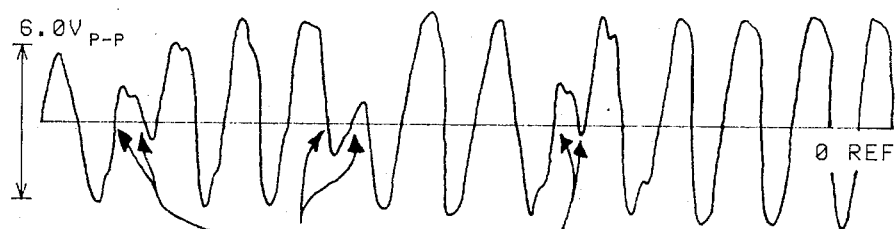

The feed ahead circuit 75 is included in the receiver 50 to solve the problem of false zero crossings as seen in FIG. 8 which result when the differentiating circuit 80 differentiates fast rise pulses near the transmitter which include distortions caused by tap reflections. The problem could also be solved by using a variable resistor R341 or variable inductor L41 or make the capacitor C10 or resistor R341 in FIG. 5c variable. In such an instance, it would be necessary to have an active automatic gain control (AGC) circuit to generate a DC control voltage. The feed ahead circuit 75 is a better solution and it feeds the high level signal directly to the high gain amplifier but blocks the feed ahead voltage at low signal levels.

Figure 9:
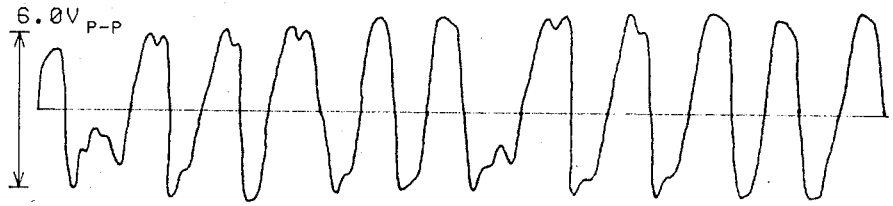
FIG. 9 is a waveform showing the transmitted signal with reflections after it has been processed with both feed ahead and differentiation.

The feed ahead circuit 75 consists of capacitor C331 connected to the emitter of transistor Q222 and to a pair of diodes D33 and D34 connected in parallel in opposite polarity, the cathode of diode D33 and anode of diode D34 being connected to capacitor C331. Capacitor C331 blocks any DC bias offset present at the emitter of transistor Q222. Diodes D33 and D34 pass the high level data signals, encountered near a transmitter but block signals below approximately 0.6 V DC. Resistor R342 of the differentiating network prevents excessive loading of the feed ahead diodes D33 and D34. FIG. 9 shows a transmitted signal with reflections processed by both the feed ahead circuit 75 and the differentiating network 80.

The feed ahead circuit 75 and the differentiating circuit 80 are connected to buffer circuit 90 and more specifically to the base of transistor Q61 via resistor R361. The collector of transistor Q61 is connected to +5 V via resistor R362 and to ground potential via capacitor C61. The emitter of transistor Q61 is connected to −5.2 V via resistor R363 and to ground potential via capacitor C62 and resistor R364. Transistor Q61 is a buffer amplifier that presents a high impedance load to feed ahead circuit 75 and differentiating circuit 80 and provides low impedance drive into high gain, wide band operational amplifier U91 via resistor R410 of amplifier circuit 135 which has its outputs connected to data terminals 136 and 137. Resistor R361 functions as an input stabilizing resistor to isolate the base capacitance of transistor Q61 from the feed ahead and differentiating circuits 75 and 80 and with the input capacitance of transistor Q61 attenuates high frequencies and prevents oscillations. Resistor R363 establishes the bias current through transistor Q61 and provides signal pull down. Capacitor C61 and resistor R362 form a decoupling network that prevents feedback through the collector of transistor Q61. Resistor R362 also reduces power dissipation in transistor Q61. Capacitor Q62 and resistor R364 couple the signal via resistor R410 to the high gain operational amplifier U91 and establish the average DC level of the signal into amplifier U91 at 0.0 V DC.

High gain amplifier U91 converts the shaped signals to ECL (emitter coupled logic) logic level outputs, while maintaining the same zero crossings. The negative side of operational amplifier U91 is used to gate the amplifier off when no carrier is present. The gating is accomplished by gate circuit 130. Gated amplifier U91 is off when no carrier is present and prevents unwanted noise at terminals 136 and 137. This also reduces cross talk to the threshold detector U101 of amplifier circuit 110.

Amplifier circuit 110 has inputs from buffer 95 and threshold circuit 100. Signals from the emitter of transistor Q222 drive the carrier band pass filter 85 which consists of a series section of capacitor C351, inductor L51 and resistor R351 and a shunt section of capacitor C352 inductor L52 and resistor R352. Filter 85 is an M derived L section and its main purpose is to block cable noise above and below the carrier frequency.

The output of filter 85 drives into buffer 95 which comprises transistor Q71 having its base connected to resistor R371. Resistor R371 is a stabilizing resistor for preventing the base capacitance of transistor Q71 from affecting the resonance of filter 85 and also prevents high frequency oscillation of buffer 95. The emitter of transistor Q71 is connected to −5.2 V via resistor R373 and to ground potential via capacitor C72 and resistor R374. Resistor R373 establishes the bias current through transistor Q71 and provides pull down. The collector of transistor Q71 is connected to +5 V via resistor R372 and to ground potential via capacitor C71. Capacitor C71 and resistor R372 are a decoupling network that prevents high frequency feedback into the collector of transistor Q71. Resistor R372 also reduces power dissipation in transistor Q71. Capacitor C72 and resistor R374 couple the signal from the emitter of transistor Q71 via resistor R301 to high gain operational amplifier U101 and establish the average DC level of the signal into U101 at 0.0 V DC. Carrier sense threshold divider circuit 100 consisting of resistors R381 and R382, where resistor R381 is connected to ground potential and resistor R382 is connected to regulated −5.2 V, sets the voltage level which must be exceeded before operational amplifier U101 will provide an output. The high gain carrier sense operational amplifier U101 converts the carrier signal to ECL output level pulses.

The ECL output level pulses are applied to the bases of transistors Q421 and Q422 DC of level shift circuit 115 via resistors R423 and R426 respectively. Resistors R421 and R422 connected to resistors R423 and R426 respectively and to −5.2 V are pull down resistors to provide loading for the outputs of operational amplifier U101. Resistor R425 connected to the emitters of transistors Q421 and R422 and to −5.2 V establishes a current into these transistors which function to convert the differential ECL outputs of amplifier U101 to TTL (transistor transistor logic) level inputs into single shot multivibrator U131 of circuit 120. The collector of transistor Q421 is connected to +5 V via resistor R424 and to a B2 input of single shot multivibrator U131. The collector of transistor Q422 is connected directly to +5 V.

When the current is switched through transistor Q421 by a high level signal on its base the voltage at its collector goes to approximately 0.0 V which is taken as a TTL low level signal. When the signal at the base of transistor Q422 is high, the voltage at the collector of transistor Q421 goes to approximately +5 V which is a TTL high level signal.

Single shot multivibrator U131 is retriggerable for converting a train of pulses to a DC output. When a train of pulses indicating the presences of the carrier is present, output $\overline{Q}$ goes low to turn off transistor Q411 of gate circuit 130. At the same time output Q of multivibrator U131 goes high to indicate carrier present at terminal 125 which is connected to decoding and data processing circuits not shown, as they are not part of the present invention. Resistor R431 and capacitor C131 set the width of single shot multivibrator greater than the carrier period so that single shot multivibrator U131 is constantly retriggered when the carrier is present.

Transistor Q411 of gate circuit 130 has its base connected to ground potential via diode D411, its emitter connected to the $\overline{Q}$ output of multivibrator U131 via resistor R412 and its collector connected to ground potential via resistor R411 and connected to the negative input of operational amplifier U91. A high output at $\overline{Q}$ turns on transistor Q411 once the series voltage of its base-emitter and diode D411 is exceeded. Resistor R412 limits the current from single shot multivibrator U131 to prevent over current damage. When transistor Q411 is turned on, the current therethrough generates a positive voltage across resistor R411 and thereby turns off operational amplifier U91. When the output $\overline{Q}$ is low, transistor Q411 turns off and the voltage across resistor R411 goes to zero. All signals into amplifier U91 will then be amplified.

From the foregoing it is seen that a number of transmitter and receiver pairs can be connected to a coaxial cable via stinger taps where the cable is terminated in its characteristic impedance at both ends and the transmitter and receiver pairs are spaced at least a predetermined distance L apart so that total signal loss due to cable loss and transmitter and receiver pair loading does not exceed 46 db. It is also seen that the transmitter has positive and negative current sources which are alternately switched to the trunk by ECL switches through respective DC isolation circuits and a capacitor. When switched from the trunk the current sources drive respective dummy loads. Data drives through ECL buffers to switch the ECL switches. A DC feedback circuit prevents unbalance between the positive and negative current sources. This same circuit contains disable circuits for disabling the positive and negative current sources to reduce power dissipation and transmitter loading of the cable by presenting high impedance at the tap.

It is also seen that the receiver has a high input impedance biasing network and buffer amplifier following a blocking capacitor that maintain the high impedance even when power is off. A capacitor drive circuit feeds input signal back to the transmitter blocking diodes and to the trunk tap to reduce capacitance at the tap. The transmitted signal shape is recovered by a network comprised of feed ahead and differentiating networks and a buffer amplifier. A gated amplifier restores the recovered signal back to logic levels ready for conversion to non-return-to-zero data. A filter and buffer restrict level detection to signals in the frequency band of the transmitter. A threshold circuit sets the carrier sense detection level and a high gain amplifier converts signals above the threshold to ECL logic levels. A level shifter converts the ECL logic levels to TTL logic signals. A TTL single shot produces a DC level from the logic level carrier signal. That DC carrier sense output enables data conversion circuits (not shown) and drives a gate circuit for gating the gated amplifier.

While the invention has been described with reference to a preferred embodiment, it should be apparent that changes can be made without departing from the scope of the invention which is to be construed by the following claims.

Having thus described the invention, what is claimed as new and desired to be secured by Letters Patent is:

1. In a data communication system having a coaxial cable and transmitter and receiver circuits for transmitting and receiving data connected to said coaxial cable along the length thereof, the transmitter circuit for transmitting data comprising:
   a pair of oppositely polled current sources,
   a pair of dummy loads,
   a pair of current steering switches connected to be controlled by said data to be transmitted to steer current from said current sources to either said dummy loads or to said coaxial cable, and
   means for selectively enabling and disabling said current sources, said current sources being enabled when data is to be transmitted, and disabled when data is not to be transmitted, the receiver circuit comprising:
   a high input impedance biasing network connected to said coaxial cable,
   a buffer amplifier connected to said biasing network to maintain high input impedance,
   signal recovery circuit means connected to said buffer amplifier for recovering the transmitted signal shape,
   control circuit means connected to said buffer amplifier for generating control signals when transmitted signals are within a predetermined frequency and amplitude range,
   gated amplifier means connected to said signal recovery circuit means to receive said recoverd transmitted signal, and
   gating means connected to said control circuit means and to said gated amplifier means whereby said gated amplifier means is turned off when a transmitted signal is outside said predetermined frequency and amplitude range, and is turned on when a transmitted signal is within said predetermined frequency and amplitude range.

2. The data communication system of claim 1 further comprising:
   at least two pairs of said transmitter and receiver circuits connected to said coaxial cable with the pairs being spaced a predetermined distance apart so that total signal loss caused by cable loss and transmitter and receiver loading is within a predefined decibel limit.

3. The data communication system of claim 2 where said predefined decibel limit is 46 decibels.

4. The data communication system of claim 1 wherein said oppositely polled current sources are positive and negative current drivers, each including a transistor connected to a resistor to form an emitter follower and a diode and resistor connected in series between the base of said transistor and said resistor for forming said emitter follower for establishing a voltage across the base and emitter of said transistor and said resistor for forming said emitter follower whereby current flows from the collector of said transistor.

5. The data communication system of claim 1 wherein each dummy load of said pair of dummy loads comprises a resistor and capacitor connected in parallel.

6. The data communication system of claim 1 wherein said transmitter circuit further comprises a pair of D.C. isolation circuits connected between said pair of current steering switches and said coaxial cable.

7. The data communication system of claim 6 wherein each D.C. isolation circuit of said pair of D.C. isolation circuits comprises:
   a pair of diodes having the same polarity connected in series,
   a terminal connected between said pair of diodes connected in series for receiving feedback data from said receiver circuit to reduce total off capacitance at the connection to said coaxial cable,
   a diode connected with opposite polarity to one diode of said pair of diodes and in series with a resistor to provide a back bias to said one diode when an associated current steering switch of said pair of current steering switches is off, and
   a capacitor connected to said one diode of said pair of diodes to provide back bias to said one diode when power to said transmitter circuit is shut off.

8. The data communication system of claim 1 wherein each current steering switch of said pair of current steering switches includes:
   a pair of transistors having their emitters commonly connected to one of said current sources, having their bases connected to be controlled by said data to be transmitted, the collector of one of said transistors being connected to one of said pair of dummy loads, the collector of the other of said transistors being connected to said coaxial cable.

9. The data communication system of claim 1 wherein said means for selectively enabling and disabling said current sources comprises:
   a first pair of transistors where one of said transistors has its collector connected to one current source of said pair of current sources and other of said transistors has its collector connected to the other current source of said pair of current sources, the bases of said one and other transistors each being connected to a resistor network for establishing a bias voltage for said pair of current sources and connected to a terminal for receiving enabling and disabling control signals, the emitters of said one and said other transistors each being connected via current establishing resistors to corresponding emitters of a second pair of transistors which has its bases connected to said coaxial cable and its collectors connected to a predetermined voltage supply.

10. The data communication system of claim 1 wherein said high input impedance network of said receiver circuit is a D. C. isolation circuit.

11. The data communication system of claim 10 wherein said D.C. isolation circuit comprises a resistor network connected to establish a D.C. bias level for said buffer amplifier and a resistor and capacitor network connected to said buffer amplifier for feeding back input signal to reduce loading effect of said receiver on said coaxial cable.

12. The data communication system of claim 1 wherein said buffer amplifier comprises a pair of transistors connected to each other and to resistor capacitor networks to form a high impedance current amplifier.

13. The data communication system of claim 1 where said transmitted signal has high and low level signals and where said signal recovery circuit means comprises a differentiating network, a feed ahead network connected in parallel with said differentiating network for feeding high level signals to said gated amplifier means and blocking low level signals and a filter network for blocking cable noise above and below the carrier frequency.

14. The data communication system of claim 1 wherein said control circuit means comprises a filter network for blocking signals outside said predetermined frequency range and threshold circuit means for setting a threshold level to establish said predetermined amplitude range.

15. The data communication system of claim 1 wherein said gated amplifier means comprises a high gain operational amplifier having one input connected to said signal recovery circuit means and another input connected to said gating means.

16. The data communication system of claim 1 wherein said gating means comprises a high gain amplifier connected to said signal recovery circuit means and to said threshold circuit means and having a pair of differential outputs, a level shift circuit connected to said pair of differential outputs for converting the differential outputs to a trigger level, a single shot multivibrator connected to said level shift circuit to be triggered by said trigger level and having one output indicating carrier sense and another output for gate for gate control, and a gate circuit connected to said another output of said single shot multivibrator and having an output connected to said gated amplifier means.

17. A high frequency transmitter circuit adapted for connection to a coaxial cable for transmission of digital data, the improvement comprising:
a pair of data terminals for receiving data to be transmitted,
a pair of high current buffers having inputs for receiving said digital data to be transmitted,
a pair of current sources,
a pair of dummy loads,
a pair of D.C. isolation circuits connected to said coaxial cable,
a pair of current switches having inputs connected to said pair of current buffers to be controlled thereby and inputs connected to said pair of current sources and outputs connected to said pair of dummy loads and to said pair of D.C. isolation circuits to steer current from said current sources to either said coaxial cable via said pair of D.C. isolation circuits or to said pair of dummy loads, and
D.C. feedback means connected for selectively enabling and disabling said pair of current sources and connected for receiving current back from said D.C. isolation circuits for preventing unbalances between said current sources of said pair of current sources.

18. The high frequency transmitter circuit of claim 17 where said pair of D.C. isolation circuits include means for maintaining a high impedance at said coaxial cable when said current switches are steering current to said dummy loads.

19. The high frequency transmitter circuit of claim 17 where said pair of D.C. isolation circuits include means for maintaining a high impedance at said coaxial cable when said transmitter is shut off.

20. A high frequency high gain receiver circuit adapted for connection to a coaxial cable for receiving therefrom transmitted digital data, the improvement comprising:
a high input impedance biasing network means connected to said coaxial cable for maintaining high input impedance to said coaxial cable with said receiver being turned on or off,
capacitor drive circuit means connected to said high input impedance circuit means to receive input signal therefrom and having one output connected to said coaxial cable to reduce capacitance at the receiver circuit connection thereto and another output connected to terminal adapted for connection to a digital data transmitter circuit,
signal recovery circuit means connected to said high input impedance biasing network means for recovering the transmitted signal shape,
control circuit means connected to said high input impedance biasing network means for generating control signals when transmitted signals are within a predetermined frequency and amplitude range,
gated amplifier means connected to said signal recovery circuit means to receive said recovered transmitted signal, and
gating means connected said control circuit means and to said gated amplifier means whereby said gated amplifier means is turned off when a transmitted signal is outside said predetermined frequency and amplitude range and is turned on when a transmitted signal is within said predetermined frequency and amplitude range.

* * * * *